United States Patent
Chaudhari et al.

(10) Patent No.: US 7,207,068 B2
(45) Date of Patent: Apr. 17, 2007

(54) METHODS AND APPARATUS FOR MODELING BASED ON CONVERSATIONAL META-DATA

(75) Inventors: Upendra V. Chaudhari, Briarcliff Manor, NY (US); Ganesh N. Ramaswamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 10/397,789

(22) Filed: Mar. 26, 2003

(65) Prior Publication Data

US 2004/0193894 A1    Sep. 30, 2004

(51) Int. Cl.
*H04L 9/00* (2006.01)
(52) U.S. Cl. .............................. 726/27; 726/28; 726/30; 713/186

(58) Field of Classification Search ................ 713/182, 713/186; 382/100, 115–119, 124; 726/27–30
See application file for complete search history.

*Primary Examiner*—Hosuk Song
(74) *Attorney, Agent, or Firm*—Anne V. Dougherty; Ryan, Mason & Lewis, LLP (57) ABSTRACT

Techniques are provided for generating data based on at least one of physical and behavioral characteristics associated with an individual, an entity or a context, which may then be used for a variety of security and/or meta-data analysis purposes. This may be accomplished, for example, by capturing and processing multiple streams of data, such as conversational meta-data, associated with an individual or an entity, and building statistical models and/or extracting heuristics from such data. The statistical models and/or heuristics may then be used, by way of example, for such purposes as user identification, verification of an identity claim, context detection and further heuristic extraction.

36 Claims, 7 Drawing Sheets

METHODS AND APPARATUS FOR MODELING BASED ON CONVERSATIONAL META-DATA

FIELD OF THE INVENTION

The present invention relates to techniques for modeling an individual, an entity or a context and, more particularly, to techniques for generating data based on at least one of physical and behavioral characteristics associated with an individual, an entity or a context, and then using such data for a variety of security and/or information fusion/retrieval purposes.

BACKGROUND OF THE INVENTION

Identifying a user and/or verifying an identity claim of a user are important steps in ensuring the security of systems, networks, services and facilities, both for physical and for logical access. Furthermore, patterns of behavior or correlated information may also indicate security risks. Existing user identification/verification is often performed on the basis of a user's knowledge of a password or a personal identification number (PIN). Existing user identification/verification may also be performed on the basis of possession of a key or a card. Other existing identification/verification techniques include the use of a single biometric feature such as a voiceprint.

Accordingly, given the growing interest in security with respect to identification/verification and the deficiencies of existing identification/verification systems, there is a clear need for an improved security framework that provides a higher degree of efficiency and/or robustness and which not only can recognize individuals but also groups of individuals, together with the patterns in the meta-data that they jointly or individually generate.

SUMMARY OF THE INVENTION

The present invention generally provides techniques for generating data based on at least one of physical (e.g., biometric) and behavioral characteristics (and, preferably, a combination of such characteristics) associated with an individual or an entity (e.g., a group of individuals), and then using such data for a variety of purposes such as security and meta-data analysis applications. This may be accomplished, for example, by capturing and processing multiple streams of data, such as conversational meta-data, associated with an individual or an entity, and building statistical models and/or extracting heuristics from such data. The generated data may then be used, by way of example, for such purposes as user identification, verification of an identity claim, context detection and further heuristic extraction.

By way of further example, in one aspect of the invention, a technique for processing data associated with an individual or an entity comprises the following steps. First, multiple data streams associated with the individual or the entity are captured. The multiple data streams represent biometric and/or behavioral characteristics associated with the individual or the entity. The multiple data streams are parsed or labeled so as to generate at least one data context sequence. Then, at least one set of components is selected from the at least one data context sequence, which idiosyncratically represents the individual or the entity, so as to generate at least one transformed data context sequence. Data may then be generated based on the at least one transformed data context sequence. Further, data that is collected may be stored in a repository which is referred to as a meta-database. The meta-database may include original data streams, as well as derived data streams (e.g., derived from one or more of parsing, transformation, analysis, etc.).

The parsing step may further include parsing the multiple data streams based on one or more dictionaries. A dictionary may be parameterized by an arbitrary set of numbers which describe a space of possible elements.

The selecting step may further include applying at least one transformation matrix to the at least one data context sequence. The at least one transformation matrix may be generated based on one or more previously established rules associated with the individual or the entity.

The generated data may include at least one model. The at least one model may be a statistical model. The generated data may also include at least one heuristic. Also, the data may be stored for subsequent use.

Further, test data may be evaluated against at least a portion of the generated data. The test data may be processed in accordance with the parsing and selection steps. The evaluating step may further include generating scores. Queries may also be generated and tested against at least a portion of the generated data.

Still further, the principles of the invention may be used to provide context detection, which may, for example, include fraud detection.

The invention also provides system learning features. System learning may occur in a number of ways. One way in which quasi-unsupervised learning is achieved is a step where the meta-database, or live data, is analyzed to find regions of constant meta-data context. A new dictionary may be created based on these regions, or an old dictionary may be augmented by a new class. A second way for learning to occur may be by adaptation to new meta-data classes or dictionaries introduced in a supervised manner, e.g., wherein a new dictionary is provided. The stored data in the meta-database may be re-analyzed taking into account the new dictionary (or dictionary classes). Thus, a new meta-database is created. The stored models are then recreated or updated with the new training data (provided by the re-analysis) in an adaptation operation.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using exemplary data streams associated with an individual, e.g., audio data, video data, global positioning system (GPS) data. It should be understood, however, that the invention is not limited to use with any particular type of data stream. That is to say, the principles of the invention may be used in accordance with any type of data such as, for example, probabilistic data and/or deterministic data (e.g., caller identification data). Thus, the invention is instead more generally applicable for use with any data that may be associated with an individual, such that statistical models or other data may be built or generated based on the obtained data, and then used for a variety of security and/or meta-data analysis purposes. Also, while the description focuses on individuals, the techniques of the invention are equally applicable for use with entities. It is to be appreciated that an entity can, for example, be a group of individuals, automated agents, etc.

As will be illustratively explained in detail herein, the present invention provides techniques for building and using models of physical and behavioral properties of an individual by analyzing multiple streams of data that are produced by or associated with that individual for the purposes of identity determination, verification, and/or information extraction. Advantageously, beyond voiceprint modeling alone, the models created in accordance with the invention may characterize an individual by the relationships of the transmission channel used, speech and language patterns, discussion topics, location, etc. As such, they are super-sets of acoustic-only speaker models which can model individuals or groups and can be used for making on-line identification and verification more efficient and robust, as well as for off-line contextual search, heuristic extraction, etc. Here the identification and verification need not be of an individual, but can also be a meta-data context, as will be explained in detail below.

Note that the term "context" as used herein generally refers to the measured values of the meta-data parameters based on the input data streams (see parsing below) for an extent that is local to some point in time. Further note that the term "heuristic" used herein generally refers to an empirically derived relationship of the meta-data parameters, which may be expressed verbally and/or numerically.

One example of a real-world application for the principles of the invention is as follows. It may be the case that individual A calls from a cell phone in a car going 40 miles per hour on a particular road in the morning, but uses a different road, etc., in the evening. Thus, the measured parameters may include the GPS coordinates, their fluctuation, the time of day, the car noise (which is dependent on speed), among others. Of course, it is to be understood that the invention is not limited to this particular application or any other application.

Figure 1:
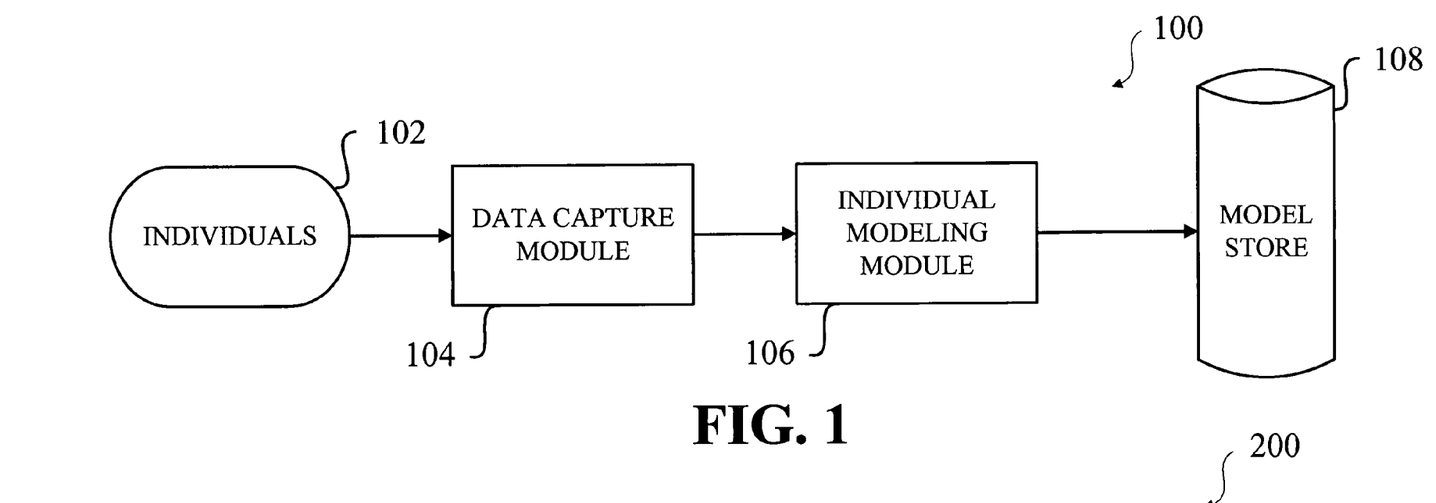
FIG. 1 is a block diagram illustrating a model building system, according to an embodiment of the present invention.

Referring initially to FIG. 1, a block diagram illustrates a model building system, according to an embodiment of the present invention. It is to be understood that the model building system of FIG. 1 is generally used to build models based on training data captured in association with one or more individuals. Such models may then be used by the scoring/search system of FIG. 2 in accordance with test data captured in association with a user (e.g., claimant) to perform such functions as identification and verification. Also, as will be explained below, such models may be used in a search to detect a particular context.

As shown, an individual 102 interacts with the model building system 100 to provide multiple streams of training data from which the models are built. This data may be obtained actively (i.e., with the knowing cooperation of the individual) or passively (i.e., without the knowing cooperation of the individual). The system 100 comprises a data capture module 104, a modeling module 106 and a model store 108.

The data capture module 104 generally represents one or more data input/output and processing devices for capturing data associated with the individual 102. The composition of the data capture module 104 depends on the type of data being captured. Thus, as previously mentioned, the invention is not limited to any particular data type.

For example, if real-time audio data is being used by the system, the data capture module 104 may include one or more microphones and audio processing equipment for capturing and processing the individual's spoken utterances such that an audio data stream representative of the utterances is produced. The data capture module 104 may also enable audio prompts to be presented to the individual to evoke certain audio responses from the individual.

Similarly, if real-time video data is being used by the system, the data capture module 104 may include one or more video cameras or sensors and video processing equipment for capturing and processing images of the individual such that a video data stream representative of images associated with the individual is produced.

Where data such as GPS data is being used by the system, the data capture module 104 may obtain the GPS data associated with the individual directly from a GPS source. The data capture module may also capture data that characterizes the one or more transmission channels with which the individual interacts with the system. Transmission channel characteristics may include background noise as a function of time, the general signal quality that can be achieved, etc.

The specific operations of the modeling module 106 will be described in detail below with reference to FIGS. 3–6. In general, the modeling module 106 builds statistical models from the data streams associated with the individual 102. The models may then be stored in model store 108. It is to be understood that models built for more than one individual, via system 100, are stored in model store 108.

Figure 2:
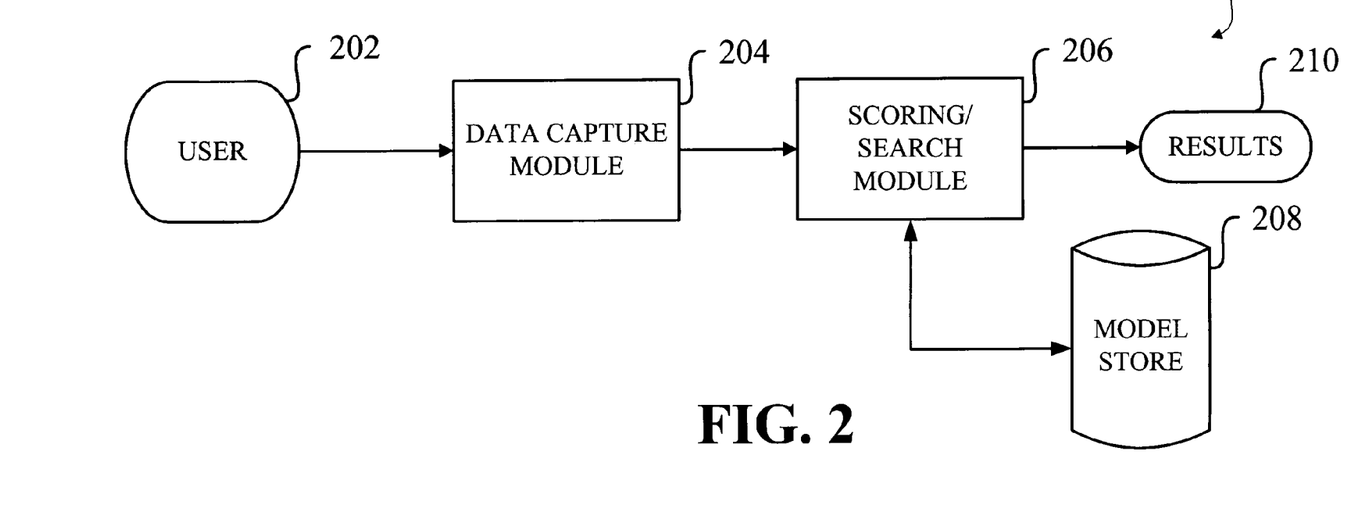
FIG. 2 is a block diagram illustrating a scoring/search system, using models built in accordance with FIG. 1, according to an embodiment of the present invention.

Referring now to FIG. 2, a block diagram illustrates a scoring/search system, using models built in accordance with FIG. 1, according to an embodiment of the present invention. As previously mentioned, the statistical models generated in the model building system 100 of FIG. 1 may be used by the scoring/search system of FIG. 2 in accordance with test data captured in association with a user (e.g., claimant) to perform such functions as identification and verification. Also, as will be explained below, such models may be used in a search to detect a particular context.

As shown, a user 202 interacts with the scoring/search system 200. The system 200 comprises a data capture module 204, a scoring/search module 206 and a model store 208. It is to be understood that the data capture module 204 is preferably comprised of the same devices and equipment as the data capture module 104 used in the training phase (FIG. 1). This is preferred so that user test data of similar modality (e.g., audio, video, GPS, etc.) to the training data can be captured. Also, it is to be understood that model store 208 stores the same data that is stored in model store 108.

The specific operations of the scoring/search module 206 will be described in detail below with reference to FIG. 7. In general, the scoring/search module 206 processes (e.g., evaluates) user test data in accordance with the statistical models in model store 208 to yield results 210. As will be explained below in the context of FIG. 7, the scoring/search module 206 also comprises a parsing module (such as that shown in FIG. 4) and a transformation module (such as that shown in FIG. 5) that process the test data. Further, score/search processing and results are dependent on the function being performed by system 200 (e.g., identification, verification, fraud detection, etc.).

It is to be further appreciated that, when training data processing and test data processing are performed by the same system, data capture module 104 and model store 108 may be the same as data capture module 204 and model store 208. Likewise, the parsing module and transformation module used by both systems may be the same.

Figure 3:
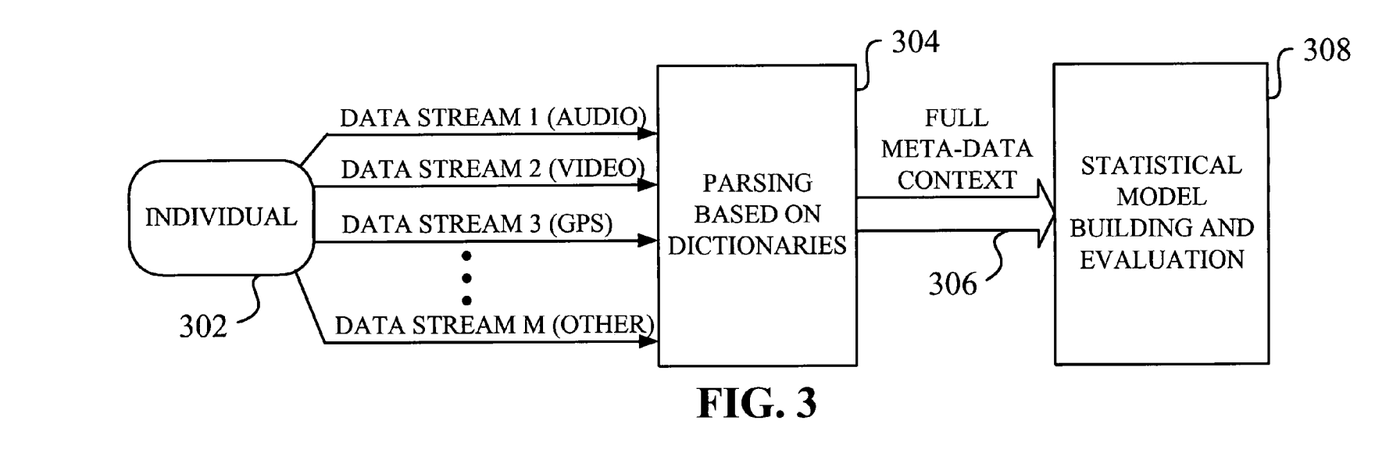
FIG. 3 is a block diagram illustrating a model creation and analysis process, according to an embodiment of the present invention.

Referring now to FIG. 3, a block diagram illustrates a model creation and analysis process, according to an embodiment of the present invention. That is, FIG. 3 depicts the overall process that may be performed by system 100 of FIG. 1 and system 200 of FIG. 2.

As shown, data streams associated with an individual 302 are captured. The data streams may include data stream 1 (audio data), data stream 2 (video data), data stream 3 (GPS data), . . . data stream M (other data).

The data streams are parsed (block 304) with respect to a number of dictionaries, representing categories such as speaker identification, channel conditions, speaking rate, phonemes, words, topics, etc. For each unit of time, a vector of labels (from the parsing) is created, representing the meta-data context or MDC (denoted as 306).

In accordance with the building aspect of block 308, the evolution of this context is analyzed over successive time units and the statistical and heuristic correlations of the various parsings (or labelings) are stored as the behavioral model, e.g., in the form of Gaussian Mixture Model (GMM) parameters, Hidden Markov Model (HMM) parameters, or rules (capturing heuristic information). At this point, it is important to note that there are different forms of heuristic information. One form is that of a general behavioral pattern such as: "Speaker A always speaks after speaker B, unless speaker C is present," or "Speakers D, E, and F always speak at around 10:00 AM on Fridays." Another form of heuristic information is that which is used in building models of individuals or entities, such as the subset of meta-data that is most discriminative for them.

In accordance with the evaluation aspect of block 308, given a set of models, when presented with a set of data streams (test data), the meta-data context sequence is created and "decoded" with respect to a number of models depending on whether identification or verification is desired. For example, a GMM or HMM score may be computed for any section of the running (or off-line) meta-data context and can be used for identification/verification decisions.

Note the creation of meta-data context or MDC 306, which takes the form of a sequence of vectors. Each data stream can occupy one or more of the MDC vector's components. The mechanism by which this occurs is the parsing with respect to various dictionaries, as will now be explained.

Figure 4:
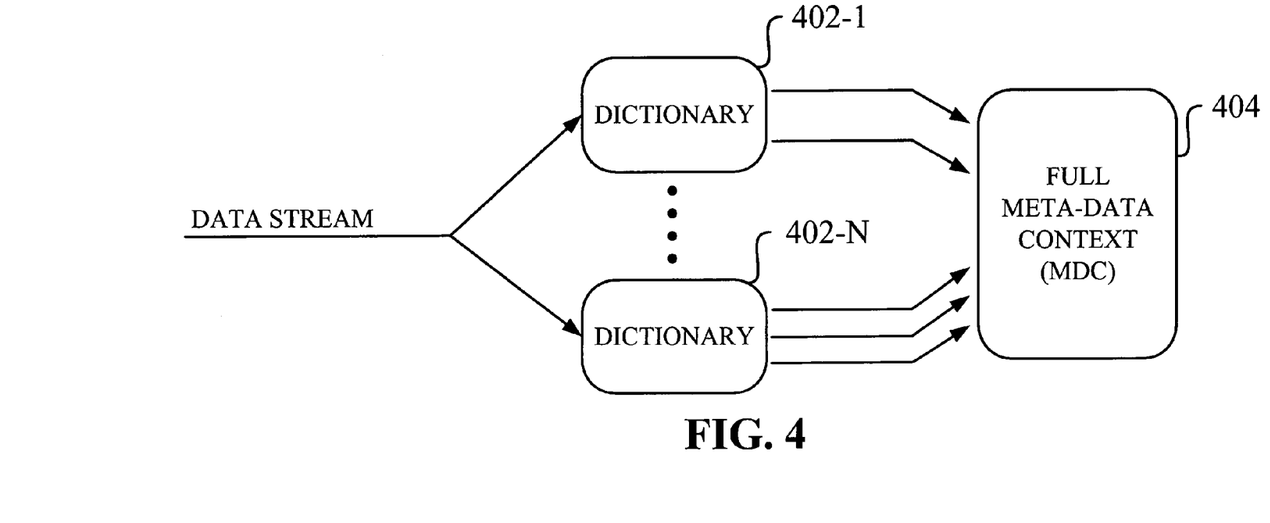
FIG. 4 is a block diagram illustrating a dictionary-based parsing process, according to an embodiment of the present invention.

Referring now to FIG. 4, a block diagram illustrates a dictionary-based parsing process, according to an embodiment of the present invention. As shown, each data stream captured by the system is parsed using dictionaries 402-1 through 402-N. The invention is not limited to a particular number of (or type of) dictionaries. The result of the dictionary-based parsing operation is the full MDC (denoted as 404).

A dictionary is a canonical way to quantify, or otherwise meaningfully represent, a data stream. For example, a set of dictionaries can be:

Biometric Based:
BIO1={voice characteristics}
BIO2={speaking rate}
BIO3={face characteristics}
BIO4={gait characteristics}

Behavior Based:
BEH1={language characteristics}
BEH2={vocabulary}
BEH3={topics spoken about}
BEH4={location information}
BEH5={contacts (other individuals)}
BEH6={devices used}

Each dictionary is parameterized by an arbitrary set of numbers which describe the space of possible elements. Multiple dictionaries can be used to analyze the same stream so that, for example, the audio stream can be parsed with respect to BIO1, BIO2, BEH1, BEH2, and BEH3. The video stream can be parsed with respect to BIO3 and BIO4. The GPS stream can be parsed with respect to BEH4.

The output of the parsing is a numerical value, or set of values, parameterizing the dictionary. For example, in a speaking rate dictionary, the parameter value is the measured value of the speaking rate, a real number, but it could be mapped to indicate very slow, slow, medium, fast, or very fast speech. For a GPS dictionary, the coordinates are the values.

The full MDC vector may therefore be defined as:

$$\text{fullMDC}_i = \{\text{BIO1}(\text{audio}_i), \text{BIO2}(\text{audio}_i), \text{BEH1}(\text{audio}_i), \ldots, \text{BIO3}(\text{video}_i), \ldots, \text{BEH4}(\text{GPS}_i), \ldots\}$$

It is to be appreciated that the components of the MDC vector are correlated in idiosyncratic ways. That is, for each individual, the correlation of a specific subset of the components is significant in indicating their identity. The determination of the specific subset is an heuristic which can be extracted from the MDC sequence at training time. This operation will now be described below.

Figure 5:
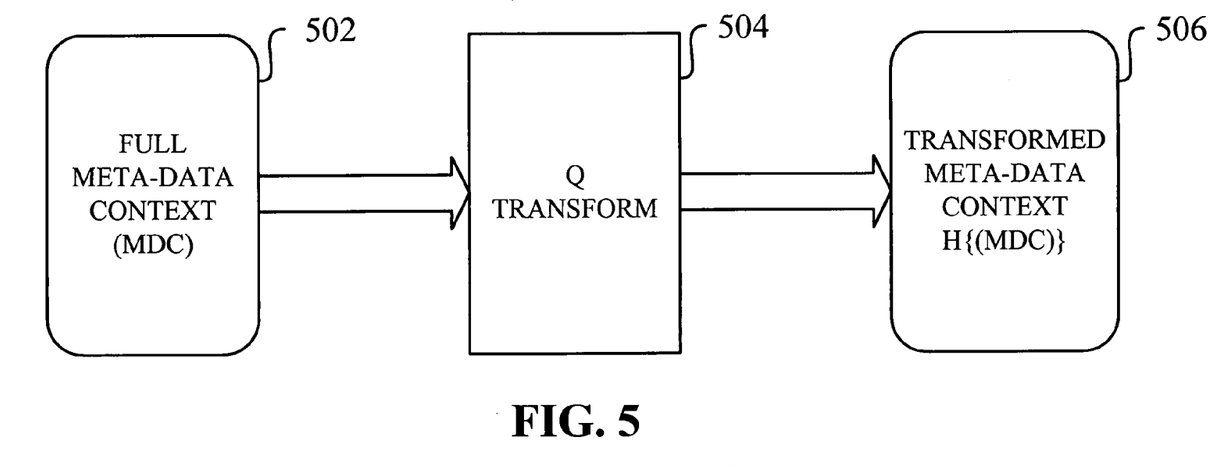
FIG. 5 is a block diagram illustrating a stream transformation process, according to an embodiment of the present invention.

Referring to FIG. 5, a block diagram illustrates a stream transformation (or extraction) process, according to an embodiment of the present invention. As shown, the full MDC (denoted as 502) is transformed (block 504) to yield an idiosyncratic stream (denoted as transformed MDC 506) focusing in on the parameters that have been heuristically determined to be most discriminative for that individual or entity. Let this stream be denoted by H. Then $H(\{MDC_i\}_{i=1,\ldots,N})$ is the new sequence:

$$H(\{MDC_i\}_{i=1,\ldots,N}) = \{\{Q \times MDC_i\}_{i=1,\ldots,N}\}$$

where Q is an n×m matrix (where, in general, n<m and m is the size of the original MDC vector) that is dependent on the individual being modeled and which serves to select the idiosyncratic set of components that have the most meaningful correlations for the individual under consideration. For example, Q may be:

$$Q = \begin{pmatrix} 1 & 0 & 0 & 0 & 0 & 0 & 0 & \ldots & 0 \\ 0 & 0 & 0 & 1 & 0 & 0 & 0 & \ldots & 0 \\ & & & & \vdots & & & & \\ 0 & 0 & 0 & 0 & 0 & 0 & 1 & \ldots & 0 \end{pmatrix}$$

In one embodiment, rules may be previously established as a mechanism for selecting the idiosyncratic set of components that have the most meaningful correlations for the individual under consideration. For instance, examples of rules may be: "For individual A, GPS and audio are important in the morning, but video is important in the evening," or "For entity B, the video is rarely a good indicator." These rules can be determined in a training phase or updated as the users are monitored over time.

Thus, the rules are implemented in accordance with the transformation matrix Q which is then applied to the MDC sequence. For instance, in the example of Q above, a '1' in the matrix represents a component in the MDC sequence that is considered to represent a meaningful correlation for the individual under consideration, while a '0' in the matrix represents a component in the MDC sequence that is not considered to represent a meaningful correlation for the individual under consideration. Therefore, the components of the MDC sequence that are considered to represent meaningful correlations for the individual are present in the transformed MDC sequence (idiosyncratic stream) H{(MDC)}, while those that are not considered to represent meaningful correlations are not present. The matrix Q is thus generated such that the appropriate rules established for the individual are applied, e.g., such that GPS and audio are selected for individual A in the morning, but video is selected for individual A in the evening.

Figure 6:
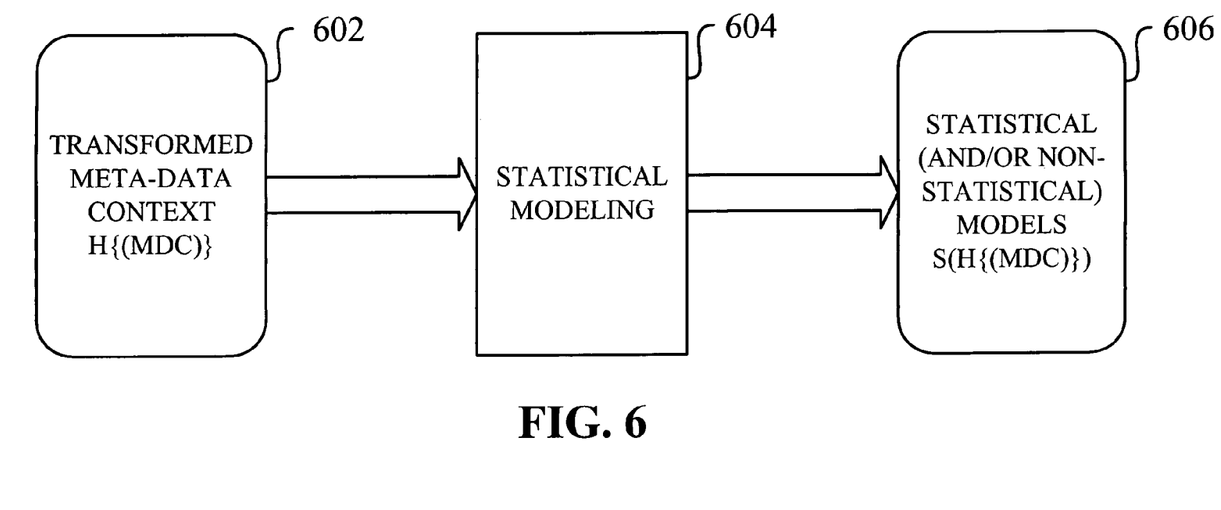
FIG. 6 is a block diagram illustrating a statistical (and/or non-statistical) model generation process, according to an embodiment of the present invention.

Referring now to FIG. 6, a block diagram illustrates a statistical (and/or non-statistical) model generation process, according to an embodiment of the present invention. Given the transformed or modified MDC (denoted as 602), it is to be appreciated that a variety of statistical models, e.g., GMM or HMM, and non-statistical models like heuristics (denoted as 606), can now be built (block 604) on top of the modified MDC sequence. Denote this model by S. Then $S(H(\{MDC_i\}_{i=1,\ldots,N}))$ represents the idiosyncratic model built on the sequence $H\{MDC_i\}_{i=1,\ldots,N}$. This sequence can be collected in one session or over time for an individual.

For detailed explanations of a number of known modeling procedures which may be employed, see Duda and Hart, "Pattern Classification and Scene Analysis," 1973, the disclosure of which is incorporated by reference herein. In general, the goal is to determine the distribution of values of the quantities one is modeling and to encapsulate that in a probability density function. Typically, this is accomplished by combining what is known of the distribution with what is learned from training data.

Accordingly, the statistical (and/or non-statistical) model 606 output by the modeling process of FIG. 6 is stored for subsequent use by the scoring/search system 200 of FIG. 2. It is to be understood that the above model building operations (FIGS. 3–6) are employed to generate a plurality of statistical and/or non-statistical models based on data obtained from individuals or entities.

Figure 7:
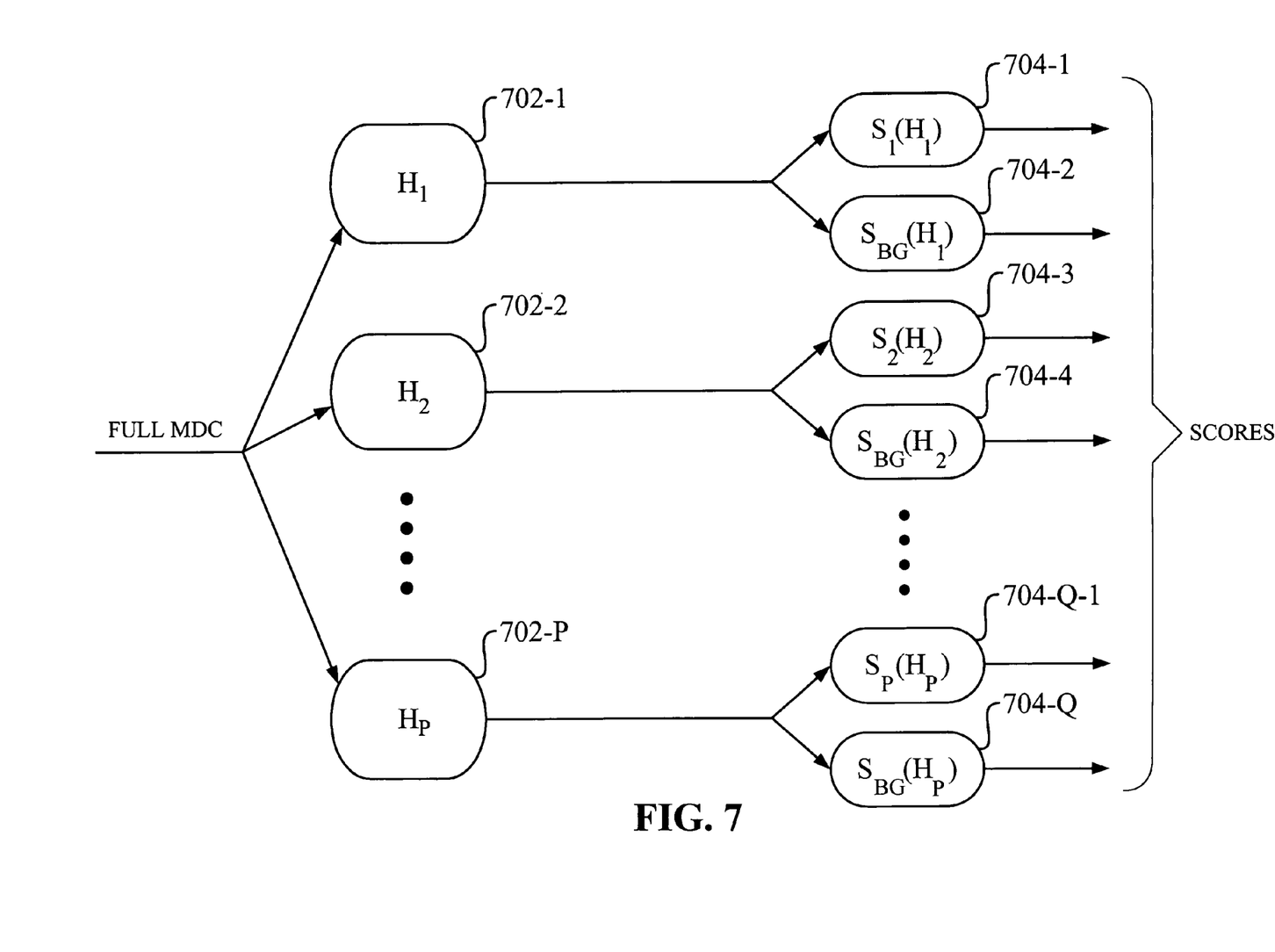
FIG. 7 is a block diagram illustrating a model scoring process, according to an embodiment of the present invention.

Referring now to FIG. 7, a block diagram illustrates a model scoring process, according to an embodiment of the present invention. In general, there is a store of target models that the system is aware of:

$$S_1(H_1(\{MDC_i\}_{i=1,\ldots,N})), \quad S_2(H_2(\{MDC_i\}_{i=1,\ldots,N})), \quad S_3(H_3(\{MDC_i\}_{i=1,\ldots,N})), \ldots$$

in addition to a background model $S_{BG}(H(\{MDC_i\}_{i=1,\ldots,N}))$ built from statistics collected over a large set of data. These models are denoted as 704-1 through 704-Q. These are the models generated in the model building system 100 of FIG. 1, and available in the model store 208 for use by the scoring/search system 200 of FIG. 2.

Data streams 702-1 through 702-P represent the processed test data. As mentioned above, the scoring/search system 200 also comprises a parsing module (such as that shown in FIG. 4) and a transformation module (such as that shown in FIG. 5). Thus, in a similar manner as explained above with respect to the training data, the test data is parsed to generate a full MDC sequence, which is then transformed to yield the idiosyncratic streams H{(MDC)} (represented in FIG. 7 as 702-1 through 702-P). Streams 702-1 through 702-P may then be scored against the models 704-1 through 704-Q. For example, as is shown, each stream is evaluated against the corresponding models (i.e., individual model and corresponding background).

When the background model is scored, the H that is used for the claimant is also used for the background, i.e., each individual has an associated background. As test data is collected over time, any subset of it can be evaluated against any subset of the models that the system is aware of so that both identification and verification are possible.

The MDC sequence to be evaluated can be generated in real time (live data), or it can be retrieved from a previously generated archive. When live data is used, verification or identification can be performed in real time. For identification, the model with the highest score is chosen, and for verification a hypothesis test is performed between a claimant model and the corresponding background model.

Figure 8:
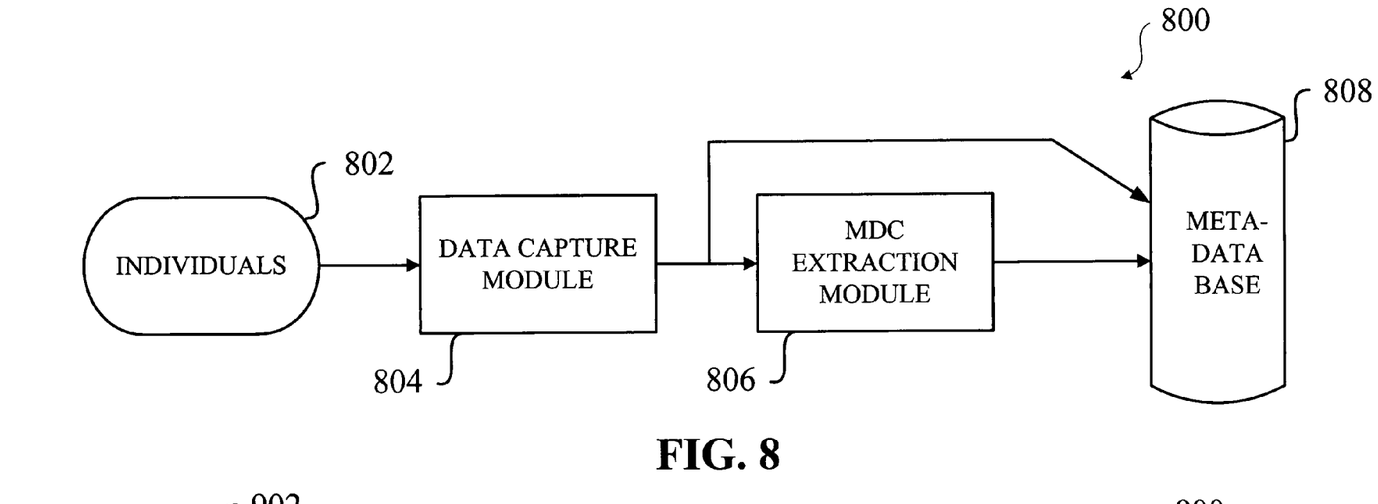
FIG. 8 is a block diagram illustrating a meta-database generation system, according to an embodiment of the present invention.
Figure 9:
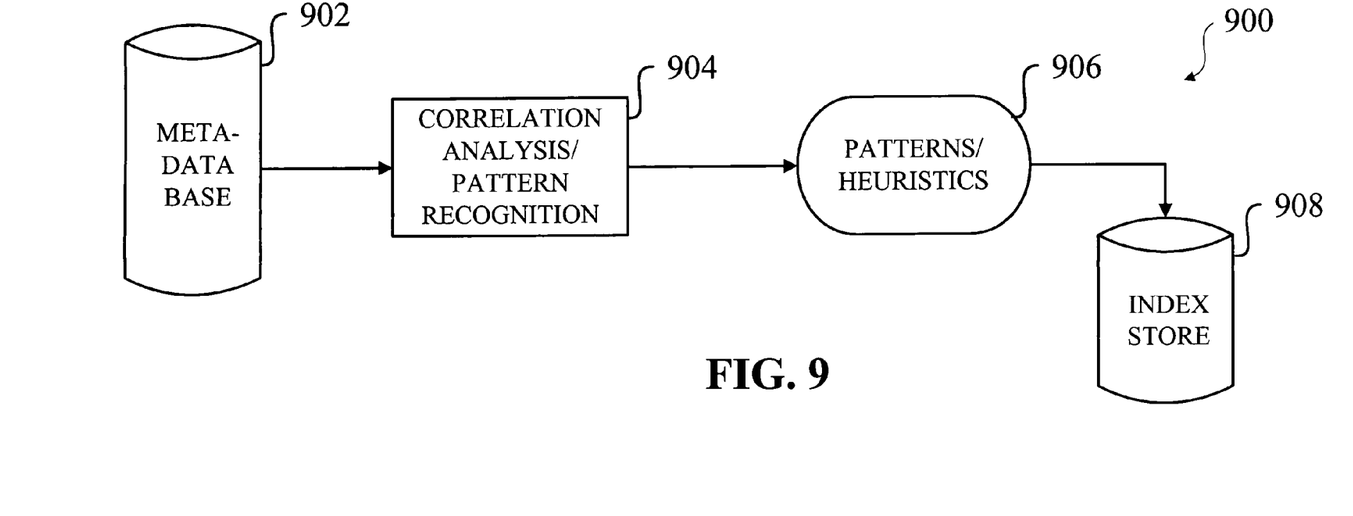
FIG. 9 is a block diagram illustrating a correlation analysis/pattern recognition system, according to an embodiment of the present invention.

As previously indicated, through analysis of the evolution of the full MDC, different forms of heuristics can be extracted. In addition to the type described in the training phase, the following types of heuristics may be extracted: "Individual A talks in the morning to system B over a cell phone while driving, on average, 40 mph," or "Individual A most often communicates with individual B." These are complex relationships among the meta-data parameters. FIGS. 8 and 9, as will now be described below, illustrate respective systems for implementing such heuristic extraction.

Referring now to FIG. 8, a block diagram illustrates a meta-database generation system, according to an embodiment of the present invention. As shown, system 800 comprises a data capture module 804, an MDC extraction module 806, and a meta-database 808.

The system 800 obtains data (e.g., audio, video, etc.) from one or more individuals 802 via data capture module 804. The data may be captured by data capture module 804 in the same manner as described above with respect to data capture modules 104 and 204. Then, MDC extraction module 806 extracts meta-data context from the captured data in the form of vector data streams. Extraction may be accomplished via the operations shown and described with regard to FIG. 4 above. That is, the output of the extraction module 806 is in the same form as that described above with regard to block 404 (full MDC). Additionally, it is to be appreciated that extraction module 806 may also apply the transformations described above with regard to block 504 of FIG. 5 to generate a transformed meta-data context.

In any case, the data generated and output by extraction module 806 is stored in meta-database 808. In addition, as shown in FIG. 8, the original data captured by the data capture module 804 may also be stored in meta-database 808. Still further, the meta-database may also store results of statistical modeling, described with regard to FIG. 6, in the form of statistical models. That is, the meta-database may contain the data stored in model store 108 (FIG. 1) and 208 (FIG. 2). Thus, meta-database 808 may serve as a repository for originally captured data, as well as all data derived therefrom (e.g., full MDC, transformed MDC, statistical and non-statistical models, etc.).

Referring now to FIG. 9, a block diagram illustrates a correlation analysis/pattern recognition system, according to an embodiment of the present invention. As shown, system 900 comprises a meta-database 902, a correlation analysis/pattern recognition module 904, and an index store 908. In general, system 900 analyzes all or portions of the data stored in meta-database 902 (which, it is to be understood, is the same as meta-database 808 shown in FIG. 8) to discover correlative heuristics and recognize patterns in the stored meta-data. These heuristics and patterns 906 may then be used for subsequent operations and/or serve as an index to the meta-data stored in the meta-database 902.

Thus, as shown, module 904 analyzes the meta-data in the database 902. Such correlation analysis and pattern recognition may be performed with known correlation analysis and pattern recognition techniques. For examples of such techniques that may be employed, see Duda and Hart, "Pattern Classification and Scene Analysis," 1973, the disclosure of which is incorporated by reference herein.

The patterns/heuristics 906 generated in module 904 may then be used by other operations such as, for example, detection of abnormal behavior (e.g., a group of individuals generate data that conflicts with previously generated heuristics). In addition, the patterns/heuristics 906 may serve as an indexing mechanism to subsequently access data in the meta-database 902. Such an index may be made available in accordance with index store 908.

The invention also allows a contextual search through an archive, which for example, could be a large quantity of previously collected data streams stored in some format (such as, for example, the meta-database described above in the context of FIGS. 8 and 9). In this case, a model and corresponding H transformation is artificially created (via the methodologies described above) with context parameters being sought and verification is performed on various portions of the archive, thus allowing to detect the context. The invention can also be used for fraud detection, including real-time detection of live fraud. In such case, models are created that are characteristic of an individual attempting to perpetrate fraud. Then, a claimant's stream is scored against these models to determine if the claimant is attempting to perpetrate a fraud. Context and fraud detection will now be further described with regard to FIG. 10.

Figure 10:
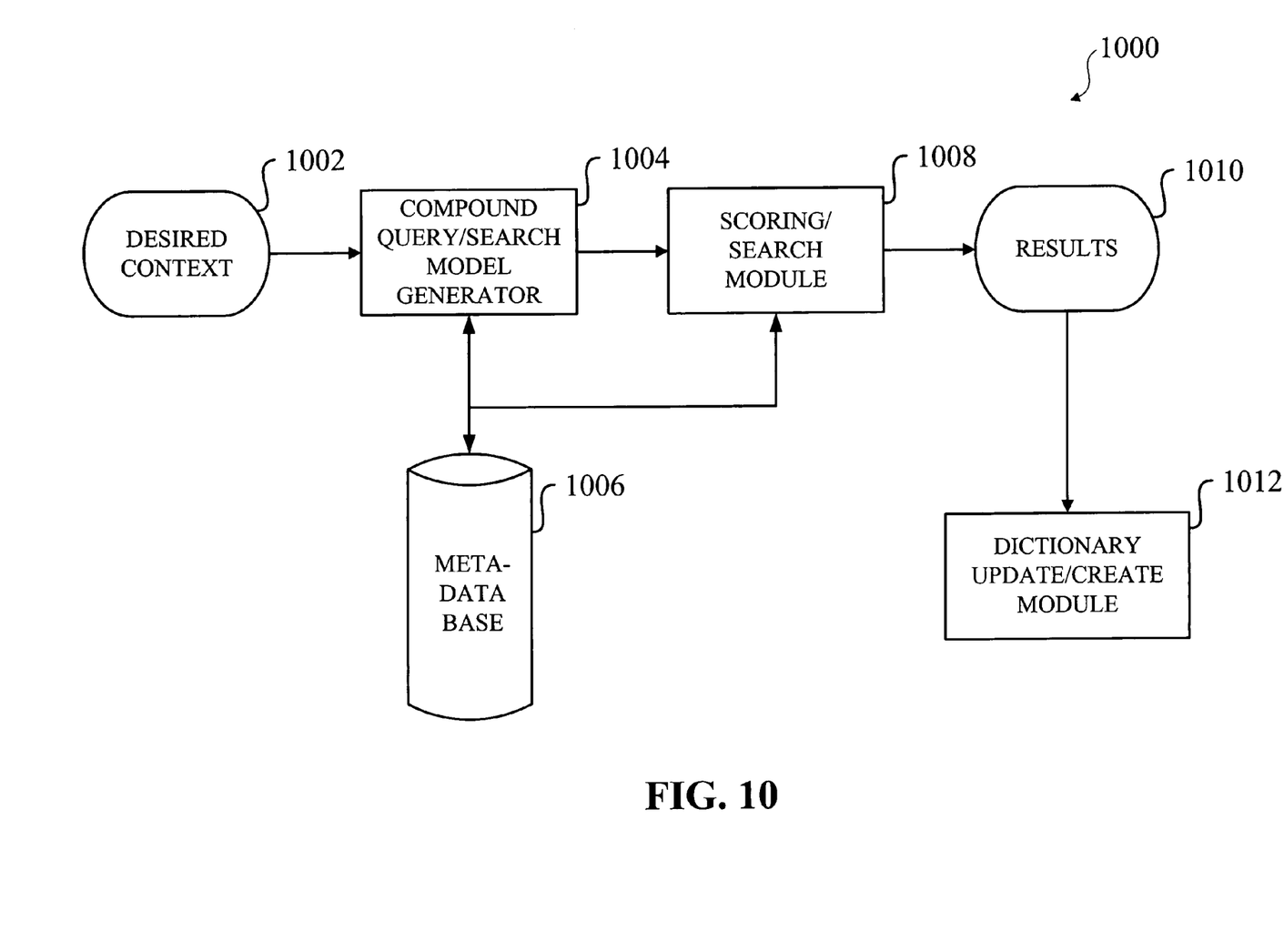
FIG. 10 is a block diagram illustrating a contextual search system, according to an embodiment of the present invention.

Referring now to FIG. 10, a block diagram illustrates a contextual search system, according to an embodiment of the present invention. As shown, system 1000 comprises a compound query/search model generator 1004, a meta-database 1006, a scoring/search module 1008, and a dictionary update/create module 1012. It is to be appreciated that meta-database 1006 may be the same as meta-database 808 (FIG. 8) and 902 (FIG. 9). Further, scoring/search module 1008 may be the same as scoring/search module 206 (FIG. 2).

Thus, for a context search, the desired context 1002 is input to compound query/search model generator 1004. The compound query/search model generator 1004 generates a query representing the desired context in the form of a model and a corresponding H transformation. This is done using the same model generation and transformation methodologies described above. Then, in accordance with the scoring/search module 1008, the meta-database 1006 is searched by scoring the query model and transformation against the stored data (models, transformations, etc.). The best scoring data may then be output as the desired context.

In the case of fraud detection, one or more models characteristic of an individual attempting to perpetrate fraud are previously created by the generator 1004 and stored in meta-database 1006. The models are created based on fraud-indicative data provided to the generator 1004. Then, a claimant's stream is scored by module 1008 against these models to determine if the claimant is attempting to perpetrate a fraud.

As previously mentioned, the invention also provides system learning features. System learning may be realized in a number of ways. One way, as illustrated in FIG. 10, is a quasi-unsupervised learning approach. This is accomplished by analyzing the meta-database (or even live data) to find regions of constant meta-data context. A new dictionary may be created based on these regions, or an old dictionary may be augmented by a new class. This may be done in dictionary update/create module 1012.

A second way for learning to occur may be by adaptation to new meta-data classes or dictionaries introduced in a supervised manner, e.g., wherein a new dictionary is provided. The stored data in the meta-database may be re-analyzed taking into account the new dictionary (or dictionary classes). Thus, a new meta-database is created. The stored models are then recreated or updated with the new training data (provided by the re-analysis) in an adaptation operation.

Figure 11:
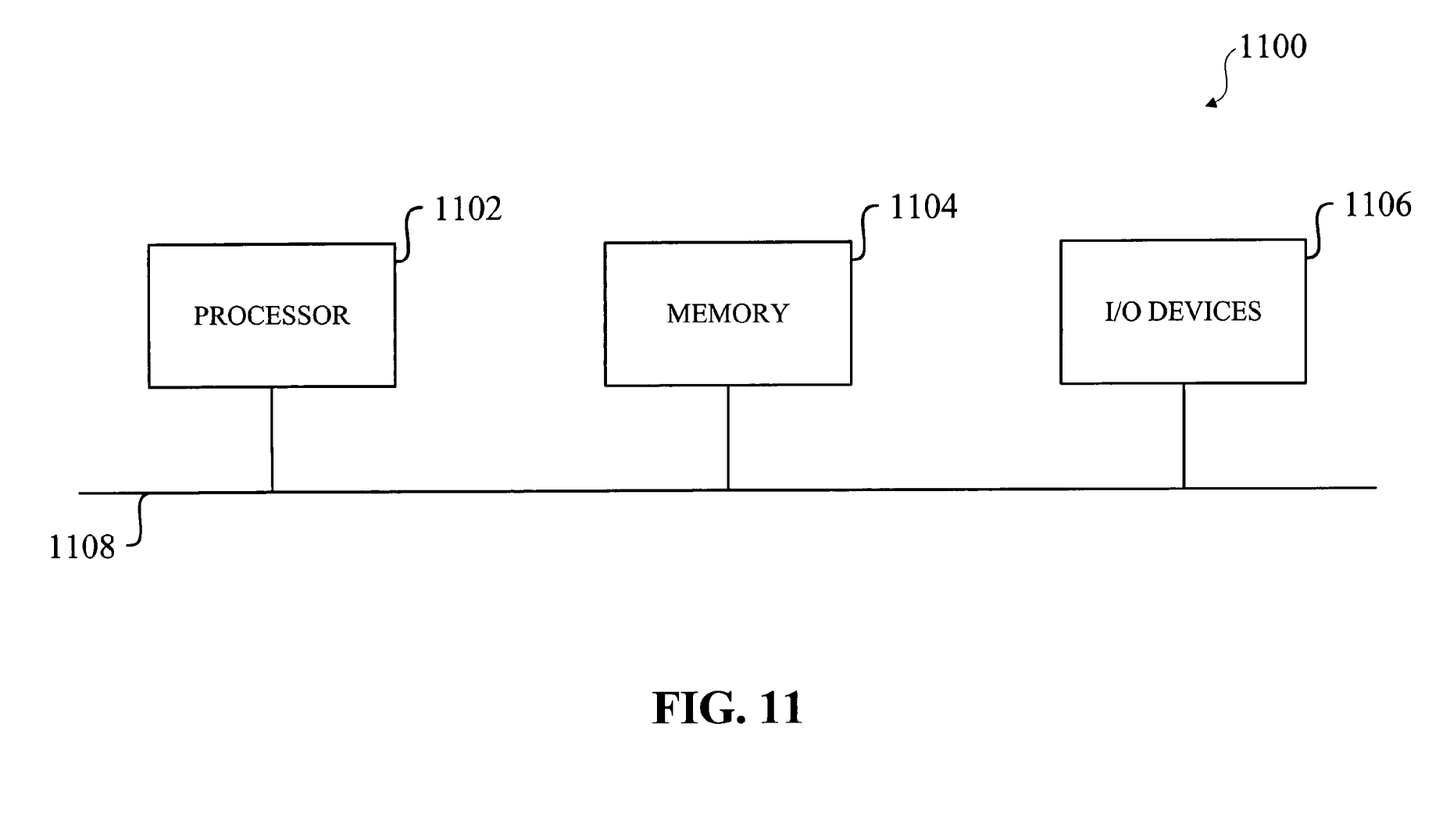
FIG. 11 is a block diagram illustrating an exemplary computing system environment for implementing one or more systems of the invention.

Referring now to FIG. 11, a block diagram illustrates an exemplary computing system environment for implementing systems of the invention, e.g., as illustrated in FIGS. 1–10. It is to be understood that an individual or user may interact with each system locally or remotely. In the local case, the individual/user interacts directly with the computing system embodying the systems. In the remote case, the individual/user interacts with the computing system (e.g., server) embodying the systems via another computing system (e.g., a client or client device), wherein the client and server communicate over a distributed network. The network may be any suitable network across which the computer systems can communicate, e.g., the Internet or Word Wide Web, local area network, etc. However, the invention is not limited to any particular type of network. In fact, it is to be understood that the computer systems may be directly linked without a network.

As shown, the computing system 1100 comprises a processor 1 102, memory 1104 and I/O devices 1106, all coupled via a computer bus 1108. It should be understood that the term "processor" as used herein is intended to include one or more processing devices, including a central processing unit (CPU) or other processing circuitry, e.g., digital signal processor, application-specific integrated circuit, etc. Also, the term "memory" as used herein is intended to include memory associated with a processor or CPU, such as RAM, ROM, a fixed, persistent memory device (e.g., hard drive), or a removable, persistent memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit. Further, the I/O devices associated with the computing system 1100 are understood to include those devices and processing equipment necessary to capture the particular data associated with an individual/user, as mentioned in detail above with respect to the data capture module.

It is also to be understood that the computing system illustrated in FIG. 11 may be implemented in the form of a variety of computer architectures, e.g., a personal computer, a personal digital assistant, a cellular phone, a microcomputer, a minicomputer, etc. However, the invention is not limited to any particular computer architecture.

Accordingly, software instructions or code for performing the methodologies of the invention, as described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing data associated with one of an individual and an entity, the method comprising the steps of:
   capturing multiple data streams associated with one of the individual and the entity, the multiple data streams representing at least one of biometric and behavioral characteristics associated with one of the individual and the entity;
   parsing the multiple data streams so as to generate at least one data context sequence; and
   selecting at least one set of components from the at least one data context sequence, which idiosyncratically represents one of the individual and the entity, so as to generate at least one transformed data context sequence.

2. The method of claim 1, further comprising the step of generating data based on the at least one transformed data context sequence.

3. The method of claim 1, wherein the parsing step further comprises parsing the multiple data streams based on one or more dictionaries.

4. The method of claim 3, wherein a dictionary is parameterized by an arbitrary set of numbers which describe a space of possible elements.

5. The method of claim 1, wherein the selecting step further comprises applying at least one transformation matrix to the at least one data context sequence.

6. The method of claim 5, wherein the at least one transformation matrix is generated based on one or more previously established rules associated with one of the individual and the entity.

7. The method of claim 2, wherein the generated data comprises at least one of a model and a heuristic.

8. The method of claim 7, wherein the at least one model is a statistical model.

9. The method of claim 2, further comprising the step of storing the generated data for subsequent use.

10. The method of claim 9, wherein at least a portion of the generated data is used for at least one of identification, verification, context detection, fraud detection and heuristic extraction.

11. The method of claim 2, further comprising the step of evaluating test data against at least a portion of the generated data.

12. The method of claim 11, wherein the evaluating step further comprises generating scores.

13. The method of claim 1, wherein the at least one data context sequence comprises a meta-data context sequence.

14. The method of claim 1, wherein the captured data streams comprise at least one of probabilistic data and deterministic data.

15. A method of processing data associated with one of an individual and an entity, the method comprising the steps of:
   capturing multiple data streams associated with one of the individual and the entity, the multiple data streams representing at least one of biometric and behavioral characteristics associated with one of the individual and the entity;
   extracting at least one data context sequence from the multiple data streams; and
   storing the at least one data context sequence in a data context database.

16. The method of claim 15, further comprising the step of storing the captured data streams in the database.

17. The method of claim 15, further comprising the step of analyzing at least a portion of data stored in the database to discover at least one of a pattern and a heuristic from the stored data.

18. The method of claim 15, further comprising the step of one of creating and updating a dictionary, used to extract a data context sequence from captured data streams, from the database.

19. The method of claim 18, further comprising the step of generating at least one of a new database and new models using the dictionary.

20. The method of claim 15, further comprising the steps of:
   generating a query from a desired context; and
   searching the database for data corresponding to the desired context.

21. The method of claim 20, further comprising the step of one of creating and updating a dictionary, used to extract a data context sequence from captured data streams, from data found to correspond to the desired context.

22. The method of claim 15, further comprising the steps of:
   generating data associated with a particular context; and
   storing the generated data in the database.

23. The method of claim 22, further comprising the step of testing subsequently captured data against the stored data associated with the particular context.

24. Apparatus for processing data associated with one of an individual and an entity, the apparatus comprising:
   a memory; and
   at least one processor coupled to the memory and operative to: (i) capture multiple data streams associated with one of the individual and the entity, the multiple data streams representing at least one of biometric and behavioral characteristics associated with one of the individual and the entity; (ii) parse the multiple data streams so as to generate at least one data context sequence; and (iii) select at least one set of components from the at least one data context sequence, which idiosyncratically represents one of the individual and the entity, so as to generate at least one transformed data context sequence.

25. The apparatus of claim 24, wherein the at least one processor is further operative to generate data based on the at least one transformed data context sequence.

26. The apparatus of claim 24, wherein the parsing operation further comprises parsing the multiple data streams based on one or more dictionaries.

27. The apparatus of claim 24, wherein the selecting operation further comprises applying at least one transformation matrix to the at least one data context sequence.

28. The apparatus of claim 25, wherein the generated data comprises at least one of a model and a heuristic.

29. The apparatus of claim 25, wherein the at least one processor is further operative to evaluate test data against at least a potion of the generated data.

30. Apparatus for processing data associated with one of an individual and an entity, the apparatus comprising:
   a memory; and
   at least one processor coupled to the memory and operative to: (i) capture multiple data streams associated with one of the individual and the entity, the multiple data streams representing at least one of biometric and behavioral characteristics associated with one of the individual and the entity; (ii) extract at least one data context sequence from the multiple data streams; and (iii) store the at least one data context sequence in the memory in the form of a data context database.

31. The apparatus of claim 30, wherein the at least one processor is further operative to store the captured data streams in the database.

32. The apparatus of claim 30, wherein the at least one processor is further operative to analyze at least a portion of data stored in the database to discover at least one of a pattern and a heuristic from the stored data.

33. The apparatus of claim 30, wherein the at least one processor is further operative to generate a query from a desired context, and search the database for data corresponding to the desired context.

34. The apparatus of claim 30, wherein the at least one processor is further operative to generate data associated with a particular context, and store the generated data in the database.

35. An article of manufacture for processing data associated with one of an individual and an entity, comprising a machine readable medium containing one or more programs which when executed implement the steps of:
   capturing multiple data streams associated with one of the individual and the entity, the multiple data streams representing at least one of biometric and behavioral characteristics associated with one of the individual and the entity;
   parsing the multiple data streams so as to generate at least one data context sequence; and
   selecting at least one set of components from the at least one data context sequence, which idiosyncratically represents one of the individual and the entity, so as to generate at least one transformed data context sequence.

36. An article of manufacture for processing data associated with one of an individual and an entity, comprising a machine readable medium containing one or more programs which when executed implement the steps of:
   capturing multiple data streams associated with one of the individual and the entity, the multiple data streams representing at least one of biometric and behavioral characteristics associated with one of the individual and the entity;
   extracting at least one data context sequence from the multiple data streams; and
   storing the at least one data context sequence in a data context database.

* * * * *